Sept. 21, 1937.   W. H. BASELT   2,093,797
BRAKE MECHANISM
Original Filed Dec. 30, 1933   5 Sheets-Sheet 1
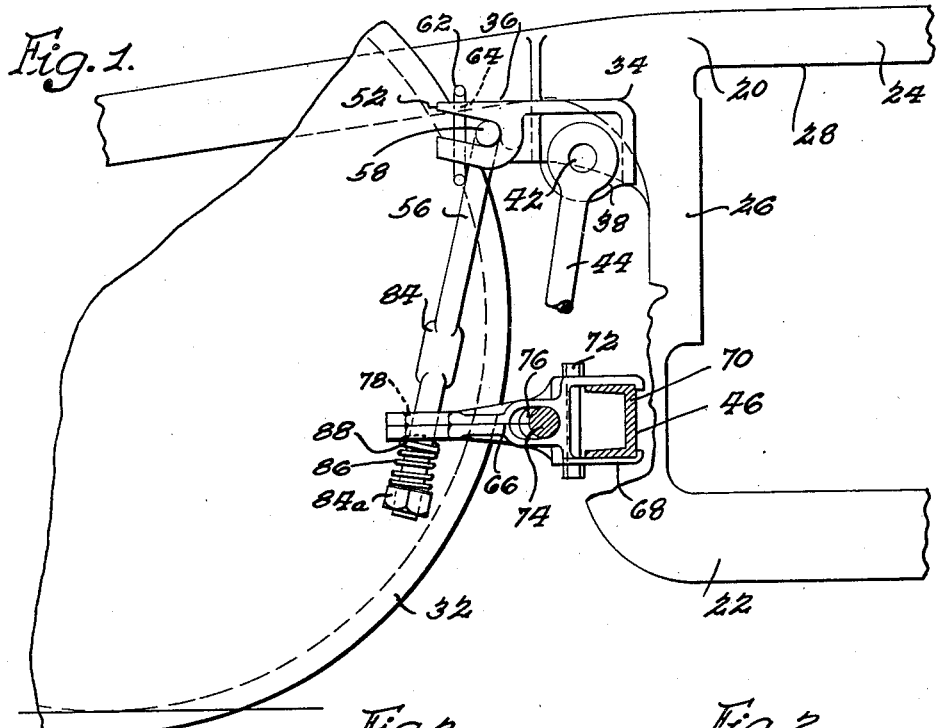
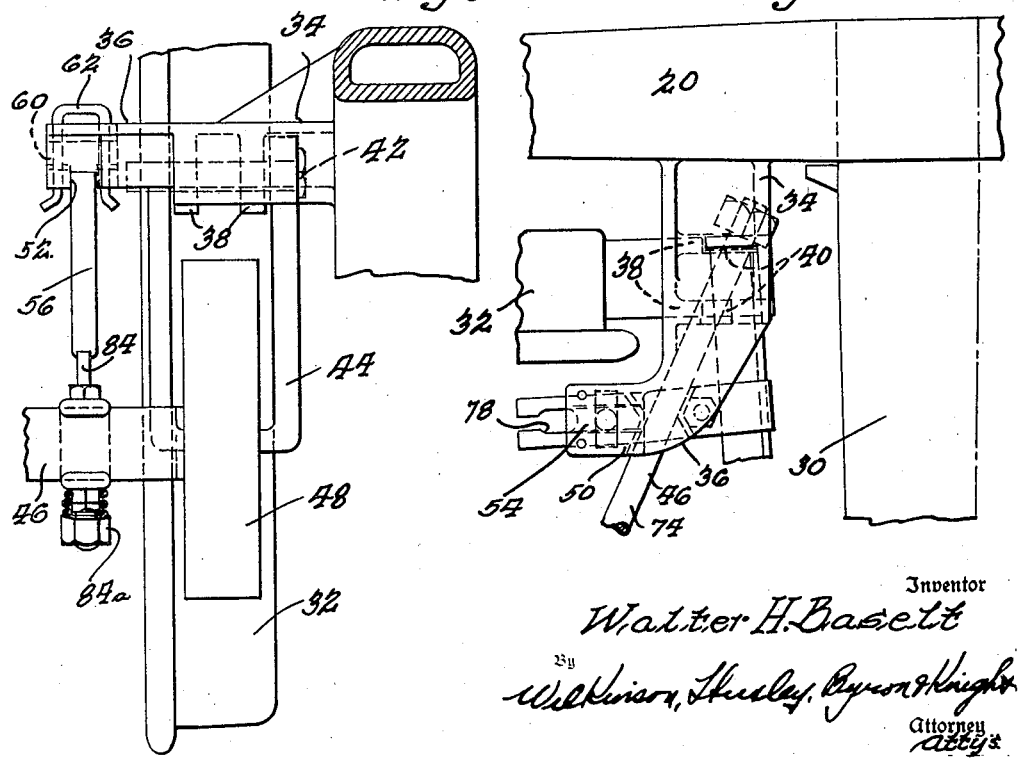

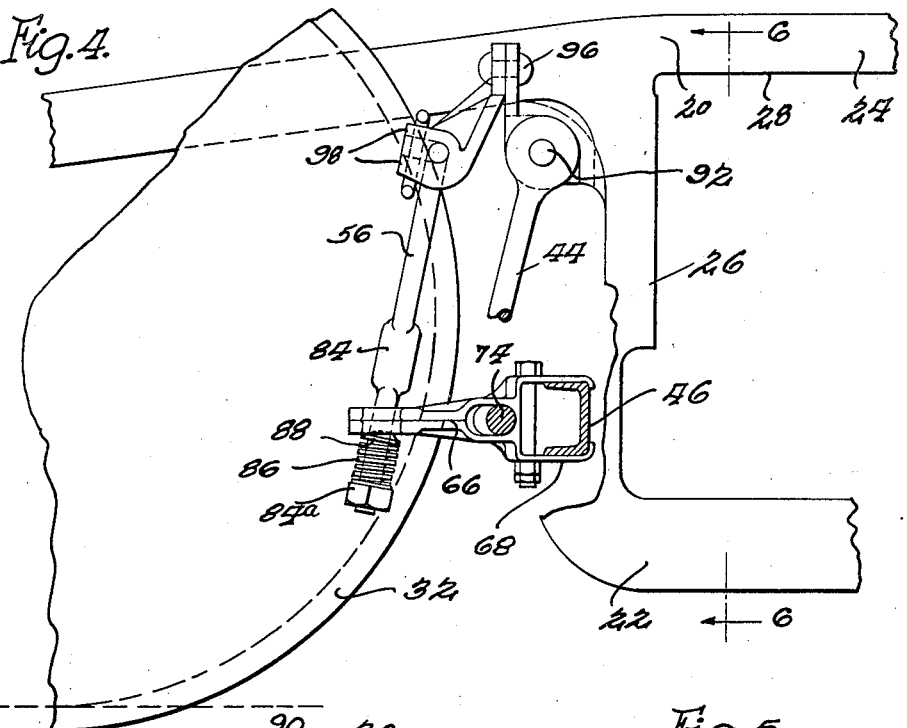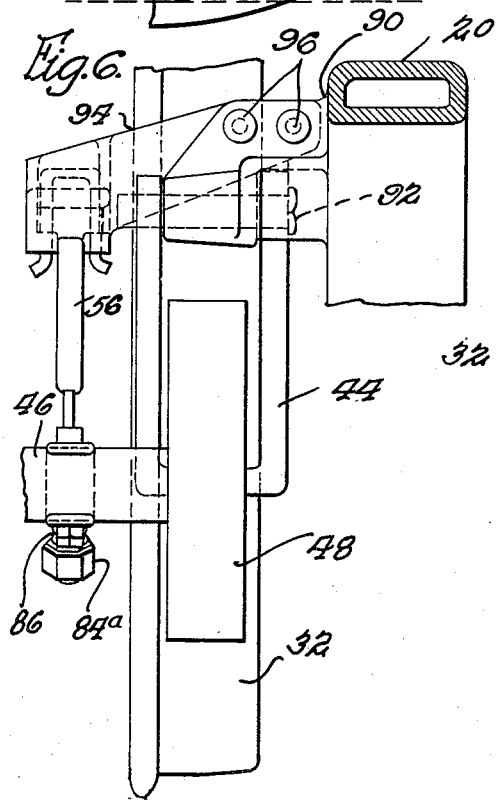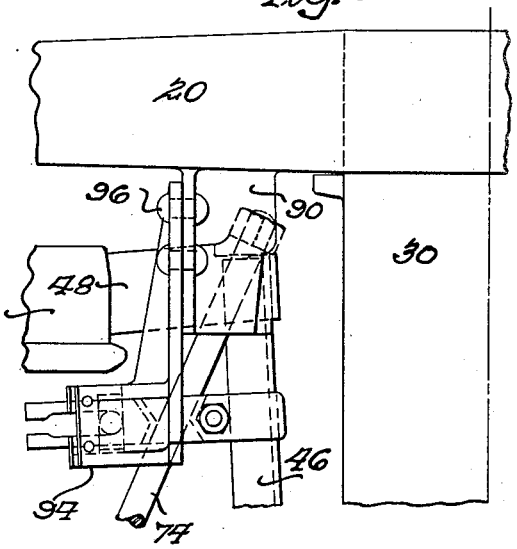

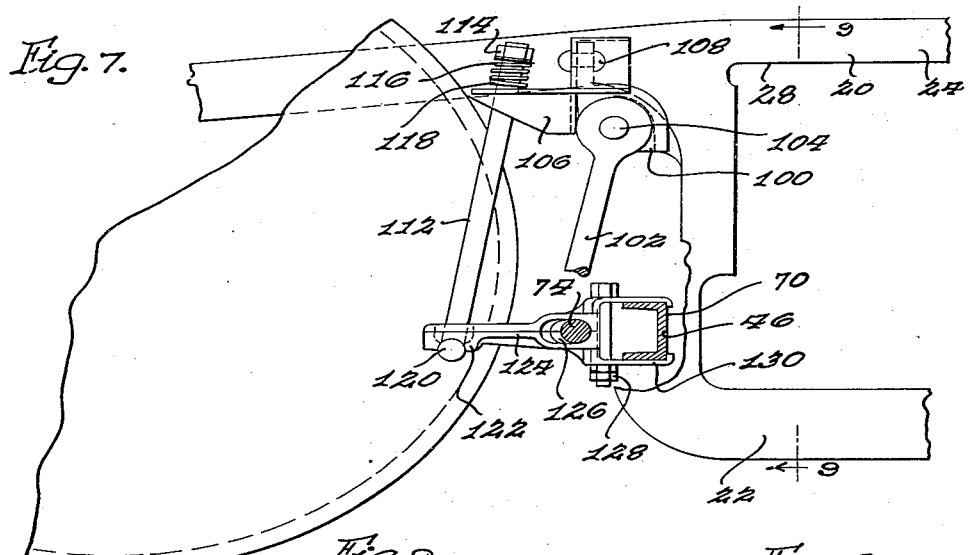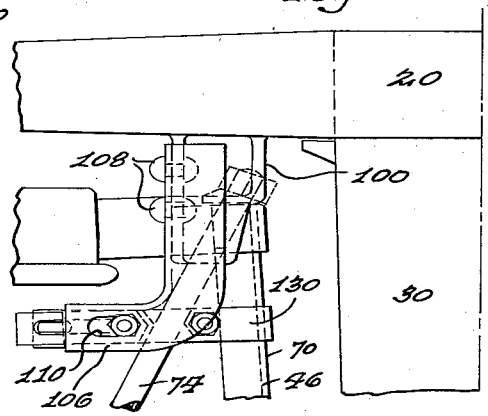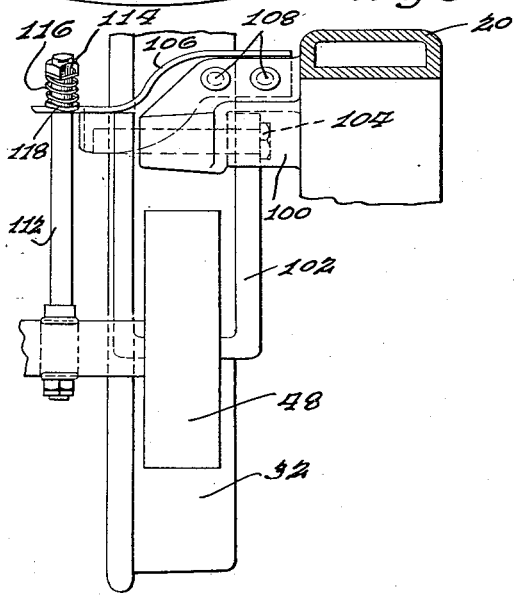

Sept. 21, 1937. W. H. BASELT 2,093,797
BRAKE MECHANISM
Original Filed Dec. 30, 1933 5 Sheets-Sheet 4
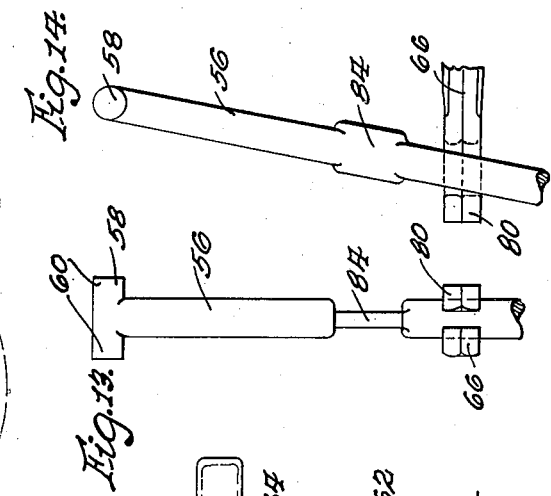
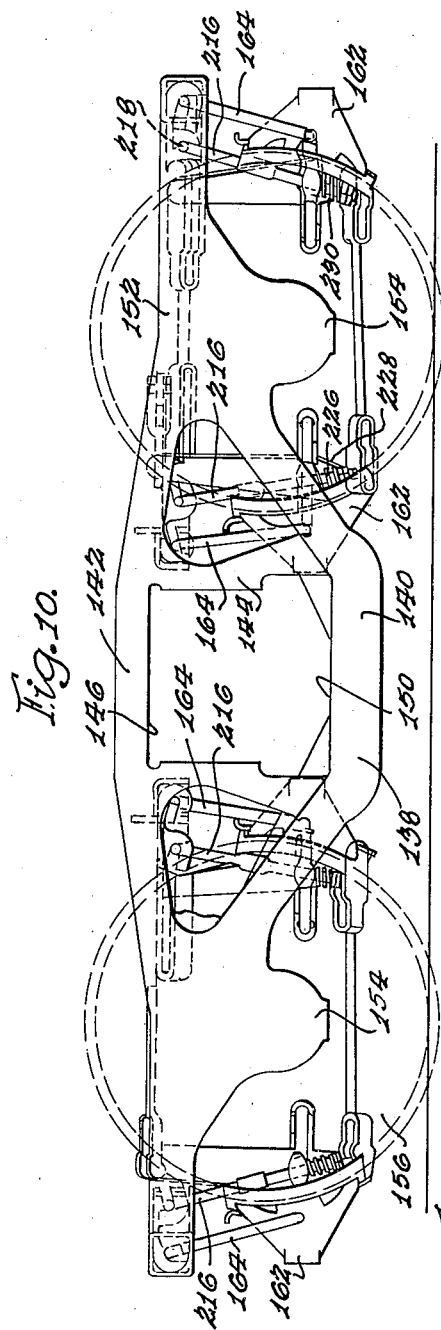
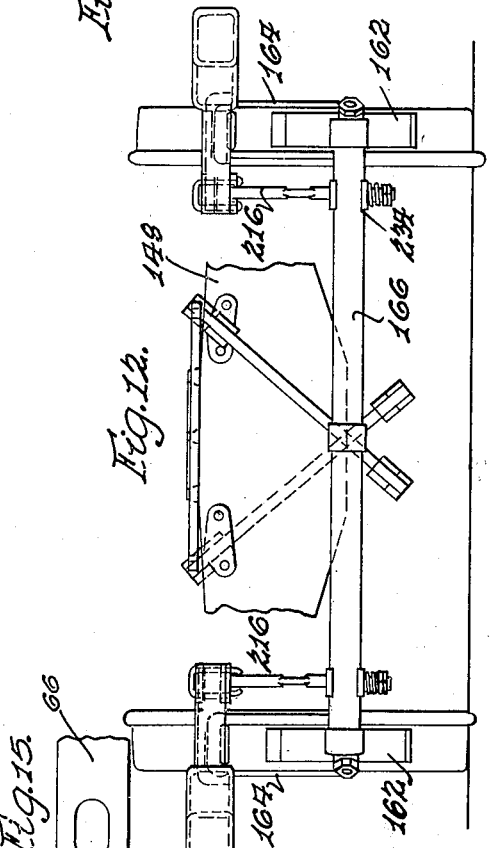
Inventor
Walter H. Baselt
By Wilkinson, Huxley, Byron & Knight
Attorneys

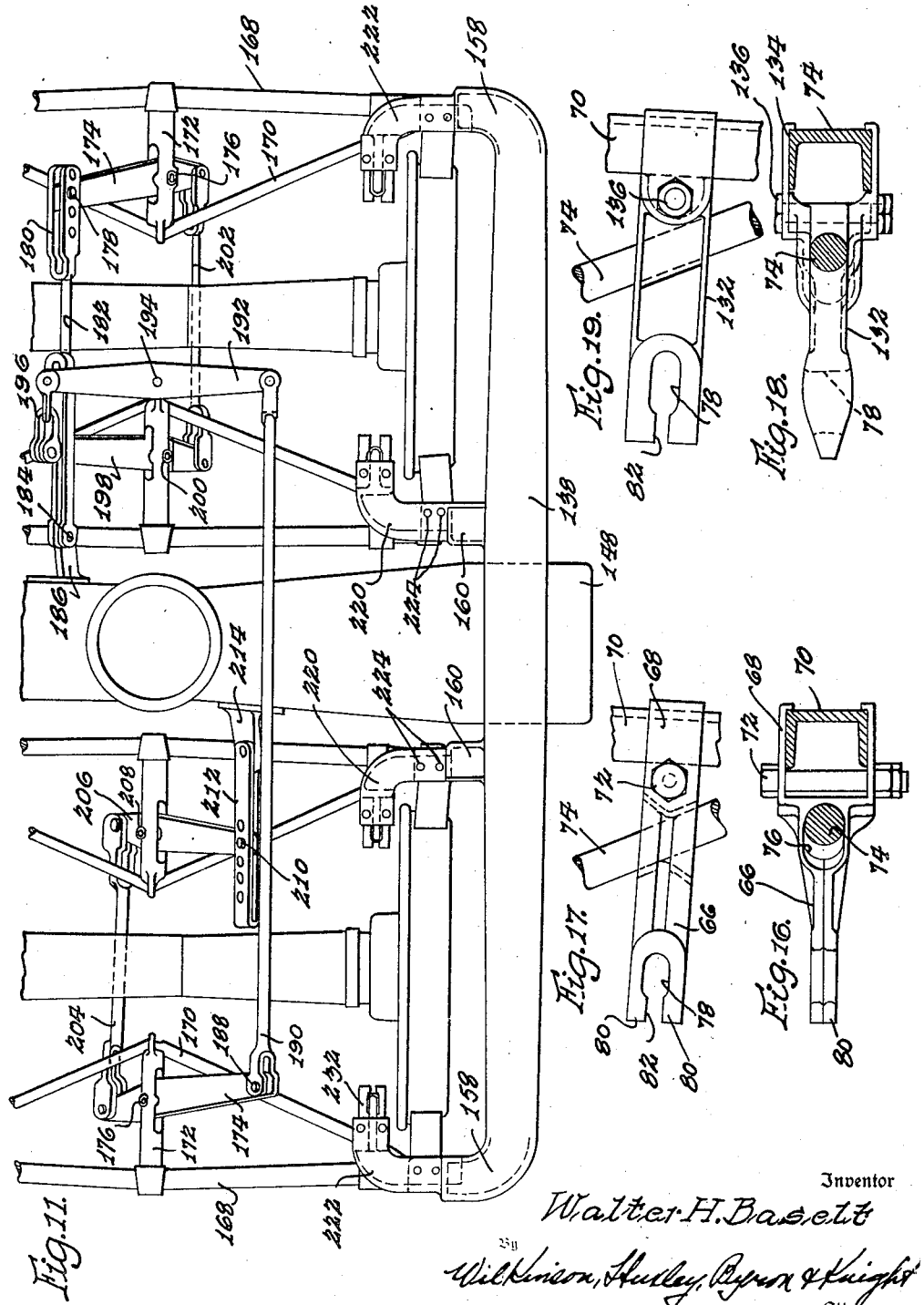

Patented Sept. 21, 1937

2,093,797

UNITED STATES PATENT OFFICE 2,093,797

BRAKE MECHANISM

Walter H. Baselt, Chicago, Ill., assignor to American Steel Foundries, Chicago, Ill., a corporation of New Jersey Original application December 30, 1933, Serial No. 704,644. Divided and this application March 20, 1936, Serial No. 69,938

26 Claims. (Cl. 188—210)

This invention pertains to car trucks and methods of suspending brake systems and more particularly to fourth point supports and safety guards, the present application being a division of application Serial No. 704,644, filed December 30th, 1933. It is equally applicable to four and six wheel trucks and to brakes of the single shoe type or clasp type.

In most types of trucks now in operation it is desirable to provide a supporting or balancing means as well as the safety guard for the brake rigging.

In the present types of supporting and safeguarding arrangements for brakes much difficulty is encountered in removing or applying the brake beams, partly because of the inaccessibility of the balancing and safeguarding means and in part because of the usually permanent methods used to secure such balancing and safeguarding means to the trucks. Great difficulty and some danger is usually encountered in the application or removal of a brake beam, a procedure frequently necessary in the maintenance of brakes, because the usual balancing and safeguarding means interferes with the ready accomplishment of this purpose. These difficulties and dangers are largely occasioned by the necessity of the workman's crawling underneath and inside the truck in order to get at and disconnect the interfering parts of the balancing and safeguarding means.

Another difficulty commonly encountered in brake systems is in maintaining the proper relationship between the wheel and the brake shoe either when the shoe is applied against the wheel tread or when it is in the released position, at which time the shoe should be held clear of the wheel.

It is therefore an object of this invention to provide a fourth point support and safety guard which permits easy release of the brake beam and which can be disconnected from the outside of the truck and replaced in the same manner.

Another object is to provide a fourth point support and safety means which is adapted to compensate for variations in the brake and truck parts whereby the brake shoe will assume the proper contact with the wheel as the brakes are applied and will not drag upon the wheel after the brakes are released.

Yet another object is to provide a safety guard for the brake beam which will prevent the beam from dropping to the track in case of the failure of a brake hanger or the loss of a brake hanger pin.

Another object is to provide a fourth point support which will properly carry the brake beam so that the desired relationship is secured between the brake shoe and the wheel.

A still further object is to provide a fourth point support and safety guard for brake beams that will be applicable to existing as well as new trucks of either the four or six wheel type, and to brake systems of either the single shoe or clasp brake type.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary side elevation partly in section of a truck construction embodying the invention;

Figure 2 is a fragmentary top plan view of the truck construction shown in Figure 1;

Figure 3 is a transverse sectional elevation of the truck construction illustrated in Figure 1, the section being taken substantially in the plane of the transverse center line of the truck;

Figure 4 is a fragmentary side elevation of a truck construction embodying a modified form of the invention;

Figure 5 is a fragmentary top plan view of the truck construction shown in Figure 4;

Figure 6 is a transverse sectional elevation of the truck construction shown in Figure 4, the section being taken substantially in the plane as indicated by the line 6—6 of Figure 4;

Figure 7 is a fragmentary side elevation of a truck construction embodying the invention and showing the fourth point support and safety guard in a further modified form;

Figure 8 is a fragmentary top plan view of the truck construction shown in Figure 7;

Figure 9 is a fragmentary transverse sectional elevation of the truck construction shown in Figure 7, the section being taken substantially in the plane indicated by the line 9—9 of Figure 7;

Figure 10 is a side elevation of a four wheel truck embodying the invention as applied to a clasp brake system;

Figure 11 is a top plan view of the truck construction shown in Figure 10;

Figure 12 is an end elevation of the truck construction shown in Figure 10;

Figure 13 is an elevation of the fourth point support hanger illustrated in Figures 1 to 6 inclusive, and Figures 10 to 12 inclusive;

Figure 14 is a side elevation of the fourth point support hanger illustrated in Figure 13;

Figure 15 is a fragmentary top plan view of the brake beam fourth point support bracket shown in Figures 16 and 17;

Figure 16 is a side elevation of one form of the brake beam fourth point support bracket showing its method of attachment to the brake beam;

Figure 17 is a fragmentary top plan view of the construction shown in Figure 16;

Figure 18 is a side elevation of a modified form of the brake beam fourth point support bracket; and Figure 19 is a top plan view of the construction shown in Figure 18.

Referring first of all more particularly to the truck constructions shown in Figures 1 to 9 inclusive, said trucks are adapted to be provided with brake rigging and fourth point support for clasp or single shoe brakes. In these trucks the side frames or beams 20 are of truss construction including the tension member 22, the compression member 24, and the spaced integral columns 26 disposed to provide the window 28 with said tension and compression members for accommodating the load carrying member or bolster 30 suitably and resiliently disposed on the tension member by means not shown. The tension and compression members merge in the usual manner adjacent the ends thereof and are provided with journal means (not shown) adapted to have cooperative engagement with the journal ends of the wheel and axle assembly 32.

In the truck construction illustrated in Figures 1 to 3 inclusive, the side frame or beam is provided with the integral inwardly extending hanger bracket 34 integrally connected to the columns and compression member adjacent the junction thereof, and the fourth point support bracket 36 is integrally provided on the hanger bracket 34. The bracket 34 is provided with the spaced lugs or jaws 38 disposed substantially in the plane of the wheel of the wheel and axle assembly 32, said lugs being apertured as at 40 for the reception of a suitable pin 42 for pivotally supporting a brake hanger 44 to which is secured the usual brake beam 46, said brake beam being supported by said brake hanger through the brake head 48. The bracket 34 is extended inwardly and provided with the integral fourth point support bracket 36, said fourth point support bracket extending inwardly of the wheel and in the direction of the axle of the wheel and axle assembly as shown at 50, said bracket being provided with the spaced jaws 52, the lower of which is slotted as at 54 for accommodating a supporting hanger such as shown in Figures 1 to 6 inclusive, and Figures 13 and 14, said hanger forming a fourth point support and safety guard for the brake beams.

The fourth point support and safety guard hanger 56 is provided with the substantially T-headed portion 58 forming oppositely extending trunnions 60 adapted to be received in the spaced jaws 52, being secured thereto as by means of the U-shaped cotter 62 extending through the spaced securing apertures 64 provided in each of the jaws 52. The safety hanger is secured to the brake beams by means of the bracket 66 (Figures 15, 16 and 17), said bracket being provided with a head 68 adapted to embrace the compression member 70 and being secured thereto as by the means 72, said bracket being made in halves to facilitate assembly. The bracket is clamped over the compression member and is held in position laterally by engagement with the tension member 74, the slot 76 being provided in the bracket for accommodating said tension member. The bracket is provided with the elongated aperture or slot 78 for receiving the safety hanger 56, the aperture being provided with the spaced jaws 80, said jaws at their outer ends being spaced apart as at 82 for facilitating assembly with the safety hanger, the hanger being provided with the flattened portion 84 adapted to be slipped through the spaced portion 82 whereby the hanger may be assembled with the bracket or removed without removing the nut or holding means 72.

The assembly is completed by the securing means 84$^a$ provided on the end of the safety hanger, the spring 86 being interposed between the nut and the rounded bearing member 88 in order to compensate for any variation in the brake parts or points of support as the beams usually have rigid heads and without this compensation the brake shoe might not assume its proper contact with the wheel.

In the construction illustrated in Figures 4 to 6 inclusive, the truck side frame or beam 20 is provided with the inwardly extending brake hanger bracket 90 for accommodating the brake hanger 44, said brake hanger being pivotally mounted on the brake hanger bracket by the pin 92. The fourth point support bracket 94 is secured to the brake hanger bracket 90 by means of the rivets 96 and extends inwardly of the adjacent wheel of the wheel and axle assembly 32, being provided with the spaced jaws 98 similar to the spaced jaws 52.

In both constructions the brake rigging is the same, the safety guard 56 pivotally supporting the brake beam 46 provided with the brake head 48 through the bracket 66.

In the construction illustrated in Figures 7 to 9 inclusive, the side frame or beam 20 is provided with the inwardly extending brake hanger bracket 100 to which the brake hanger 102 is pivoted as at 104, the brake hanger being pivoted to the brake head 48. The fourth point support bracket 106 is riveted as at 108 to the brake hanger bracket and extends inwardly of the wheel. In this form of the device a different form of fourth point hanger is provided, the bracket 106 being apertured as at 110 for accommodating the fourth point hanger 112 extending therethrough. The upper end of the hanger is provided with the securing means 114 between which and the rounded bearing washer 118 cooperating with bracket 106 is provided the compensating spring 116 performing the same function as the compensating spring 86. The fourth point support hanger is provided adjacent the lower end thereof with the trunnions 120 receivable in suitable bearings 122 in the bracket 124. The bracket is secured to the brake beam 46 between the brake heads 48 in a manner similar to the bracket 66. The bracket 124 is formed in two parts to facilitate assembly and is provided with a slotted portion 126 for receiving the tension member 74 of the brake beam, the bracket then being clamped through the securing means 128 in the jaws 130 to the brake beam compression member 70 to complete the assembly.

The form of bracket illustrated in Figures 18 and 19 is a one piece bracket 132 which may be made either with the slotted end 78—82, or with the end such as illustrated in the bracket shown in Figures 7 to 9 inclusive. The shank of the bracket is slotted for the reception of the tension member 74, but in this instance the jaws 134 are integrally cast with the shank and initially are spread slightly apart. After the jaws are assembled around the brake beam compression member 70 they are drawn tightly together and clamped by means of the bolt 136. The upper and lower surfaces of slotted end 78—82 are rounded for direct engagement with spring 86, thereby eliminating rounded bearing member 88.

The truck construction illustrated in Figures 10 to 12 inclusive, shows the application of the fourth point support hangers, such as illustrated in Figures 1 to 6 inclusive, to a clasp brake. In this truck construction the side frame or beam 138 is similar to the side frame or beam 20, being provided with the tension and compression members 140 and 142 integrally connected by means of the spaced columns 144 forming the window 146 for the accommodation of the bolster or load carrying member 148, the bolster being supported on the spring seat 150 by suitable means. The tension and compression members merge adjacent the ends thereof as at 152 and are provided with the journal means such as the journal boxes 154 adapted to have cooperative engagement with the journal ends of the wheel and axle assemblies 156. The merged portion 152 is extended beyond the ends of the wheels to form the brake hanger brackets 158.

The side frame is provided with the inner brake hanger brackets 160 disposed adjacent the columns 144, the inner and outer brake hanger brackets being adapted to pivotally support the brake heads 162 by the hangers 164. The brake heads are fixed on the brake beams 166, each of said brake beams including a compression member 168, the tension member 170 and the fulcrum 172. Each of the fulcrum members is slotted, the end fulcrum members being provided with the brake levers 174 pivotally mounted thereto as at 176, the upper end of one of the end brake levers (shown at the right end of Figure 11) being adjustably pivoted as at 178 to the clevis 180 of the rod 182 which is pivoted as at 184 to the bracket 186 provided on the bolster 148.

The other end brake lever 174 is pivoted as at 188 to the pull rod 190 which in turn is pivoted at its other end to the equalizing bar 192, said bar being adapted to be operated through means connected as at 194 for operating the brake arrangement. The other end of the bar 192 is pivoted through the clevises 196 to an intermediate brake lever 198, which brake lever is pivotally mounted as at 200 to the intermediate fulcrum of one of the intermediate brake beams (shown at the right of the bolster in Figure 11). The other end of the brake lever 198 is connected to the pull rod 202 which is connected to the other end of the adjacent end brake lever 174. The lower end of the other end brake lever (shown at the left of Figure 11) is connected through the pull rod 204 to the lower end of the intermediate brake lever 206, said brake lever being pivotally mounted as at 208 to the fulcrum of the left intermediate brake beam, the upper end of the brake lever 208 being adjustably pivoted as at 210 to the strap 212, said strap being pivoted to the bracket 214 provided on the bolster.

The brake beams are provided with the fourth point hangers 216 which are similar to the hangers 56, the upper trunnions 218 thereof being pivoted to the fourth point support brackets, which are shown as intermediate brackets 220, and end brackets 222, which may be either integral with the brackets 160 and 158 respectively, or separate and secured thereto as by the rivets. In this construction, the equalizing springs 226 are interposed between the securing means 228 and the rounded lower surface of slotted ends 232 of brackets 234, said brackets being similar to brackets illustrated in Figures 18 and 19. It is of course appreciated that the support illustrated in Figures 7 to 9 inclusive, can be used in place of those illustrated in this arrangement.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. A hanger including a body portion having means for supporting the same adjacent one end thereof, securing means adjacent the opposite end, and a flattened portion intermediate the ends for facilitating assembly with a brake beam bracket.

2. A hanger for brake mechanism including a body portion of substantially uniform width throughout its length except for a portion intermediate its ends of less width, said last-named portion being provided to facilitate assembly with a brake beam, means adjacent one of its ends for supporting the same, and securing means adjacent the opposite end.

3. A hanger for brake mechanism including a body portion of substantially uniform diameter throughout its length except for a non-circular portion intermediate its ends of less width than said diameter, said last-named portion being provided to facilitate assembly with a brake beam, means adjacent one of its ends for supporting the same, and securing means adjacent the opposite end.

4. A hanger including a body portion having means for pivotally supporting the same adjacent one end thereof, securing means adjacent the opposite end, and a flattened portion intermediate the ends for facilitating assembly with a brake beam bracket.

5. A hanger for brake mechanism including a body portion of substantially uniform width throughout its length except for a flattened portion intermediate its ends of less width for facilitating assembly with a brake bracket, means adjacent one of its ends for supporting the same, and securing means adjacent the opposite end.

6. A hanger including a body portion having spaced trunnions adjacent one end thereof, securing means adjacent the opposite end, and a flattened portion intermediate the ends for facilitating assembly with a brake beam bracket.

7. A hanger including a body portion having oppositely disposed trunnions adjacent one end thereof, securing means adjacent the opposite end, and a flattened portion intermediate the ends for facilitating assembly with a brake beam bracket.

8. A fourth point support hanger including a body portion having a trunnioned head adjacent one end thereof, a threaded portion adjacent the other end thereof, and a flattened portion intermediate the ends thereof for facilitating assembly with an associated bracket.

9. A fourth point support hanger including a body portion having a fixed trunnioned head adjacent one end thereof, a threaded portion adjacent the other end thereof, means threaded on said portion serving as an abutment, and a coil spring encircling said body portion and adapted to seat against said abutment.

10. In brake mechanism, the combination of a hanger member, a brake beam, a bracket member secured to said beam, said members having securing means, one of said members having a slot and the other of said members having a flattened portion cooperating with said slot facilitating assembly of said members.

11. In brake mechanism, the combination of a hanger member, a brake beam, a bracket member secured to said beam, said members having securing means, one of said members having a slot and the other of said members having a restricted portion cooperating with said slot facilitating assembly of said members.

12. A hanger including a body portion having means for supporting the same, securing means adjacent the opposite end, and a restricted portion intermediate the ends for facilitating assembly with a brake beam bracket.

13. In brake mechanism, the combination of a hanger member, a brake beam, a bracket member secured to said beam, means for securing said members, said means including resilient means between said members, one of said members having a slot and the other of said members having a restricted portion cooperating with said slot facilitating assembly of said members.

14. In brake mechanism, the combination of a hanger member, a brake beam, a bracket member secured to said beam, means for securing said members, said means including resilient means between said members, one of said members having a slot and the other of said members having a flattened portion cooperating with said slot facilitating assembly of said members.

15. In brake mechanism, the combination of a hanger member, pivotal supporting means therefor, a brake beam, a bracket member secured to said beam, said members having securing means, one of said members having a slot and the other of said members having a restricted portion cooperating with said slot facilitating assembly of said members.

16. In brake mechanism, the combination of a hanger member, pivotal supporting means therefor, a brake beam, a bracket member secured to said beam, said members having securing means, one of said members having a slot and the other of said members having a flattened portion cooperating with said slot facilitating assembly of said members.

17. In a car truck, the combination of a side frame having a bracket, a brake beam having a bracket, a hanger for support of said brake beam, said hanger having trunnions pivotally engaging one of said brackets, and resilient means between said hanger and the other of said brackets.

18. In a car truck, the combination of a side frame having a bracket, a brake beam having a bracket, a hanger for support of said brake beam, said hanger having trunnions engaging said brake beam bracket, and resilient means between said side frame bracket and hanger.

19. In a car truck, the combination of a side frame having a bracket, a brake beam having a bracket, a hanger for support of said brake beam, said hanger having trunnions adjacent one end pivotally engaging said brake beam bracket and an adjustable abutment at the other end thereof, and resilient means between said side frame bracket and said abutment.

20. In brake mechanism, the combination of a brake beam, a hanger for said beam, a safety hanger member for said beam, means for supporting said hangers, means for connecting said first-named hanger to said brake beam, means for connecting said safety hanger member to said brake beam, said last-named means comprising a bracket member connected to said brake beam, one of said members having a slot and the other of said members having a restricted portion cooperating with said slot facilitating assembly of said members.

21. In brake mechanism, the combination of a brake beam, a hanger for said beam, a safety hanger member for said beam, bracket means for supporting said hangers, means for connecting said first-named hanger to said brake beam, means for connecting said safety hanger member to said brake beam, said last-named means comprising a bracket member connected to said brake beam, one of said members having a slot and the other of said members having a restricted portion cooperating with said slot facilitating assembly of said members.

22. In a car truck, the combination of a side frame, brake mechanism associated therewith, said mechanism including a brake beam, a hanger for said beam, a safety hanger member for said beam, bracket means on said side frame for supporting said hangers, means for connecting said first-named hanger to said brake beam, means for connecting said safety hanger member to said brake beam, said last-named means comprising a bracket member connected to said brake beam, one of said members having a slot and the other of said members having a restricted portion cooperating with said slot facilitating assembly of said members.

23. In a car truck, the combination of a side frame, bracket means disposed thereon and having a slot, brake mechanism associated therewith, said mechanism including a brake beam, a hanger connected to said bracket means and said beam for normal support thereof, a safety hanger member having trunnions at one end thereof cooperating with the slots of said bracket means to pivotally support the same, and means for connecting said safety hanger to said brake beam, said last-named means comprising a bracket member connected to said brake beam, one of said members having a slot and the other of said members having a restricted portion cooperating with said slot facilitating assembly of said members.

24. In a car truck, the combination of a side frame having a bracket, brake mechanism associated therewith, said mechanism including a brake beam having a bracket, a hanger connected to said bracket and said beam for normal support thereof, a safety hanger for supporting said brake beam under abnormal conditions, said last-named hanger having trunnions pivotally engaging one of said brackets, and resilient means between said safety hanger and the other of said brackets.

25. In a car truck, the combination of a side frame having a bracket, brake mechanism associated therewith, said mechanism including a brake beam having a bracket, a hanger connected to said bracket and said beam for normal support thereof, a safety hanger for supporting said brake beam under abnormal conditions, said last-named hanger having trunnions engaging said brake beam bracket, and resilient means between said side frame bracket and said safety hanger.

26. In a car truck, the combination of a side frame having a bracket, brake mechanism associated therewith, said mechanism including a brake beam having a bracket, a hanger connected to said bracket and said beam for normal support thereof, a safety hanger for supporting said brake beam under abnormal conditions, said last-named hanger having trunnions adjacent one end pivotally engaging said brake beam bracket and an adjustable abutment at the other end thereof, and resilient means between said side frame bracket and said abutment.

WALTER H. BASELT.